United States Patent
Boyen et al.

(10) Patent No.: US 9,567,057 B2
(45) Date of Patent: Feb. 14, 2017

(54) AIRCRAFT FUSELAGE STRUCTURE AND METHOD

(71) Applicant: Airbus Operations GmbH, Hamburg (DE)

(72) Inventors: Magdalena Boyen, Hamburg (DE); Wolfgang Eilken, Hamburg (DE); Wolfgang Schulze, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 427 days.

(21) Appl. No.: 14/084,692

(22) Filed: Nov. 20, 2013

(65) Prior Publication Data
US 2014/0151504 A1    Jun. 5, 2014

Related U.S. Application Data

(60) Provisional application No. 61/731,500, filed on Nov. 30, 2012.

(30) Foreign Application Priority Data

Nov. 30, 2012 (EP) ..................... 12195152

(51) Int. Cl.
B64C 1/06      (2006.01)
B64F 5/00      (2006.01)
B64C 1/00      (2006.01)

(52) U.S. Cl.
CPC ............. B64C 1/069 (2013.01); B64C 1/061 (2013.01); B64C 1/068 (2013.01); B64F 5/0009 (2013.01); B64C 2001/0081 (2013.01); Y10T 29/49622 (2015.01)

(58) Field of Classification Search
CPC ........... B64C 1/061; B64C 1/068; B64C 1/069
See application file for complete search history.

(56) References Cited

U.S. PATENT DOCUMENTS

| | | | |
|---|---|---|---|
| 2,405,643 A | 8/1946 | Andre | |
| 2006/0060705 A1 | 3/2006 | Stulc et al. | |
| 2010/0272954 A1 | 10/2010 | Roming et al. | |
| 2011/0089291 A1 | 4/2011 | Dietrich et al. | |
| 2011/0095129 A1* | 4/2011 | Villares ..................... | F16B 5/04 244/119 |
| 2012/0132750 A1 | 5/2012 | Gorr et al. | |

FOREIGN PATENT DOCUMENTS

| | | |
|---|---|---|
| DE | 102007029500 | 1/2009 |
| DE | 102009021369 | 11/2010 |
| WO | 2009065587 | 5/2009 |

OTHER PUBLICATIONS

European Search Report, Apr. 2, 2013.

* cited by examiner

*Primary Examiner* — Nicholas McFall
(74) *Attorney, Agent, or Firm* — Greer, Burns & Crain, Ltd.

(57) ABSTRACT

An aircraft fuselage structure having a first fuselage barrel section and a second fuselage section barrel which are joined by tension fasteners extending through frame holes. A shank diameter of the fasteners is smaller than a respective frame hole diameter. A first positive locking element and a second positive locking element is provided forming a form-fit area with the first positive locking element in the circumferential direction. A method for producing such an aircraft fuselage section is also provided.

7 Claims, 2 Drawing Sheets

AIRCRAFT FUSELAGE STRUCTURE AND METHOD

CROSS-REFERENCES TO RELATED APPLICATIONS

This application claims the benefit of the U.S. Provisional Application No. 61/731,500, filed on Nov. 30, 2012, and of the European patent application No. 12 195 152.9 filed on Nov. 30, 2012, the entire disclosures of which are incorporated herein by way of reference.

BACKGROUND OF THE INVENTION

The invention concerns an aircraft fuselage structure and a method for producing an aircraft fuselage structure.

Known aircraft fuselage structures comprising several fuselage barrel sections, which are aligned in longitudinal direction and which are joined together by means of so called circumferential or orbital joints. As shown in U.S. 2006/0060705 A1 two fuselage barrel sections are joined by a butt strap that extends in circumferential direction and that is riveted to their skins. Additionally, opposite stringers of the fuselage barrel sections are connected with each other by stringer couplings. Hereby, a multiplicity of longitudinal straps cross the butt strap and are connected to stringer flange portions. As shown in DE 10 2007 029 500 A1, a frame can be attached to a butt strap and to stringer couplings. As shown in WO 2009/065587 A1, a butt strap, stringer couplings and a frame can be made as one single part.

SUMMARY OF THE INVENTION

The object of the present invention is to create an aircraft fuselage structure that is easy and fast to manufacture. Furthermore, it is the object of the invention to create a method for producing such an aircraft fuselage structure.

An inventive aircraft fuselage structure comprises a first fuselage section which has a first skin and a first frame half The first frame half is attached to the first skin via a first flange portion and has a first web portion which extends from the first flange portion. Further on, the aircraft fuselage structure comprises a second fuselage section which has a second skin and a second frame half The second frame is attached to the second skin via a second flange portion and has a second web portion which extends from the second flange portion. The frame halves are connected by fasteners extending through frame holes in the web portions and forming a single frame. Furthermore, a shank diameter of the fasteners is smaller than a respective frame hole diameter. Further on, the first web portion has a first positive locking element and the second web portion has a second positive locking element both establishing a form-fit in circumferential direction.

The invention consists of a combination of a tension bolt concept for tension load transfer and a form-fit concept for the transfer of the shear loads at a circumferential joint of two fuselage sections. This enables the circumferential joint to be closed much faster in comparison with the known joint concepts mentioned before. Due to the smaller shank diameter of the fastener in comparison with the respective frame hole set, a tolerance adjustment of the fuselage sections is integrally realized. Additional assembly steps for tolerance compensation can be omitted. Additionally, if the fasteners are bolts, the circumferential joint can be opened. This enables a simple detachment and change of fuselage sections for maintenance reasons.

In order to enable a smooth or uniformed shear load transfer between the fuselage sections, both the first web portion and the second web portion can have at least two positive locking elements. Preferably, two positive locking elements are positioned in one fuselage plane. Hereby, the two form-fit areas are positioned in an angle of 180° to each other. Further on, also three positive locking elements per web portion are possible. Preferably, three positive locking elements are positioned in an angle of 120° to each other. However, there are also four positive locking elements per web portion possible, wherein two positive locking elements are positioned in a first fuselage plane and two positive locking elements are positioned in a second fuselage plane which is orthogonal to the first fuselage plane. Hereby, four form-fit areas are built, which have an offset of 90°. Preferably, the first fuselage plane is the horizontal fuselage plane and the second fuselage plane is the vertical fuselage plane. There are even more than four form-fit areas possible.

According to one embodiment, which is very easy to manufacture and to install, each first positive locking element has a shoulder and each second positive locking element has a counter shoulder.

In order to enable a transfer of shear forces in a first circumferential direction and in an opposite circumferential direction, the two positive locking elements laying in one plane can have opposite counter surfaces.

According to another embodiment, each positive locking element has a structure such as a serration plate comprising a plurality of parallel teeth. As an in this embodiment always several teeth are engaged, the circumferential joint is highly stressable. Further on, such positive locking elements from overlapping areas which enables a precise tolerance adjustment.

If the teeth of each structure are orientated in radial direction and thus spaced apart from each other in circumferential direction, a tolerance adjustment can be executed in longitudinal, transversal, vertical and in circumferential direction of the aircraft fuselage sections.

In order to avoid the aircraft fuselage sections from drifting apart in their form-fit areas, locking fasteners can be provided which extend through web holes in the form-fit areas.

In a preferred method for producing an aircraft fuselage structure according to the invention, frame halves are attached to a skin of two fuselage sections via flange portions, wherein before the attachment of the frame halves to the respective skin or afterwards, corresponding finished frame hold patterns are introduced in web portions of the frame halves. Then, the aircraft fuselage sections are positioned opposite to each other and are aligned in horizontal, vertical and circumferential direction. Finally, the fuselage sections are joined by inserting fasteners through the frame holes, wherein the fasteners have a shank diameter that is smaller than a respective frame hole diameter.

Such a method enables a fast and quick aircraft fuselage assembly as the fuselage sections covers an integrated tolerance compensation. Due to the integrated tolerance compensation, the frame hole patterns can be formed without any previous alignment of the fuselage sections. Thus, assembly steps such as closing the joint preliminarily, drilling rivet holes, opening the joint, cleaning the holes and closing the joint finally by rivets can be omitted.

Other advantage examples of the embodiment of the invention are the subject of further subsidiary claims.

BRIEF DESCRIPTION OF THE DRAWINGS

In what follows, preferred examples of embodiments of the invention are elucidated in more detail with the aid of the kinetic representations. Here.

DETAILED DESCRIPTION OF THE PREFERRED EMBODIMENTS

Figure 1:
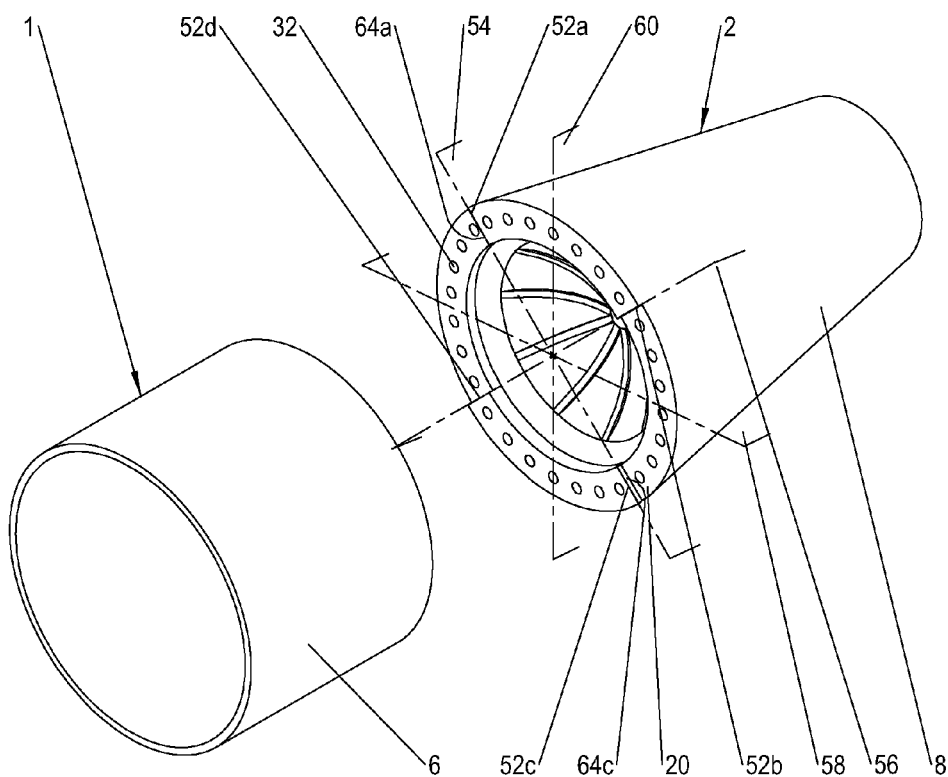
FIG. 1 shows a perspective view of a first embodiment of an aircraft fuselage structure according to the invention in preassembly state, FIG. 2 a cross section of a circumferential joint according to the first embodiment, FIG. 3 a top view of the circumferential joint, FIG. 4 a top view of a circumferential joint according to a second embodiment of the invention, and FIG. 5 a perspective view of a fuselage section according to the second embodiment of the invention.
Figure 2:
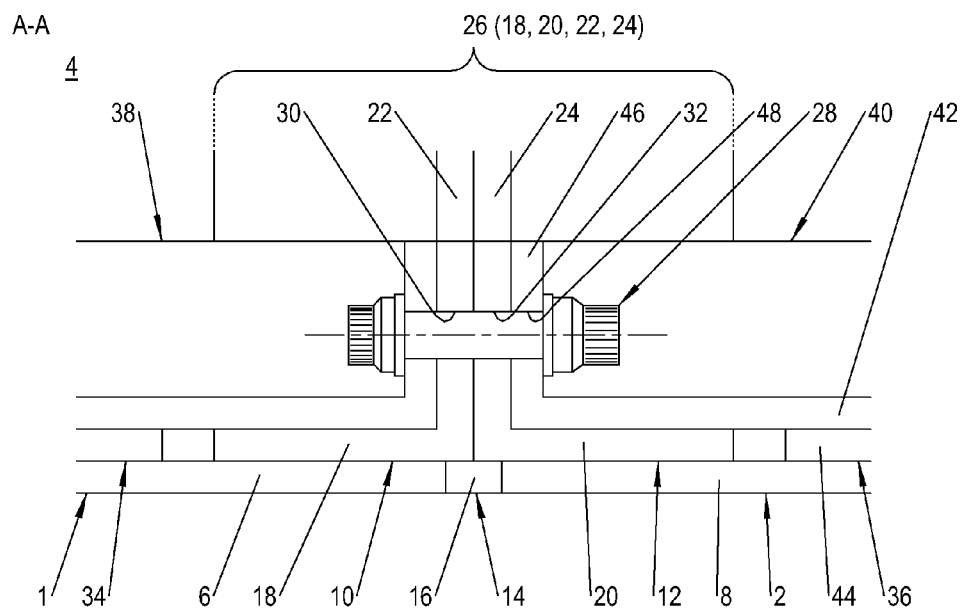
Figure 3:
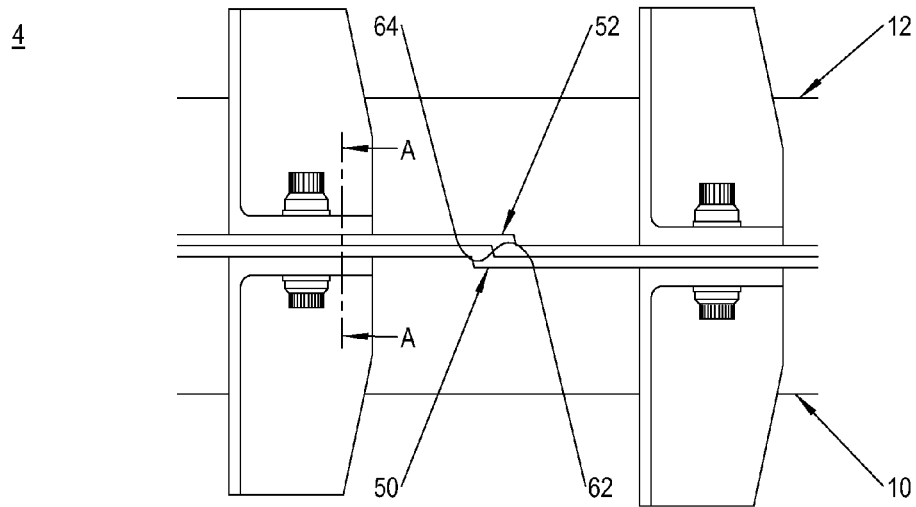

In FIGS. 1, 2 and 3, a first embodiment of an aircraft fuselage structure according to the invention is shown. In particular, a first fuselage section 1 and a second fuselage section 2 are shown ready for joining. Here, the first fuselage section 1 is a middle section and the second fuselage section 2 is the rear section of the aircraft fuselage structure. The fuselage sections 1, 2 are positioned in their axial direction and form a circumferential joint 4 after their joining as shown in FIG. 2. Each fuselage section 1, 2 has a barrel like shape with a skin 6, 8 and one frame half 10, 12.

Preferably, the frame halves 10, 12 consist of a multiplicity of frame half sections, for instance four frame half sections. As shown in FIG. 2, the frame halves 10, 12 are positioned in such a way relative to the fuselage sections 1, 2 that in longitudinal direction x they extend over the skins 6, 8. Thus, a direct skin contact of the fuselage sections 1, 2 is avoided. A gap 14 which is formed between the skins 6, 8 is filled up with a sealant 16 for aerodynamical reasons. Each frame half 10, 12 has a flange portion 18, 20 via which they are connected to the skin 6, 8 and a web portion 22, 24 which extends orthogonally and in particular radially inwardly from the flange portions 18, 20.

As illustrated in FIG. 2, in the assembled state, the frame halves 10, 12 form a single ring frame 26 extending in circumferential direction. In order to form the ring frame 26, the frame halves 10, 12 are connected by a multiplicity of fasteners 28 which extend through frame holes 30, 32 in their web portions 22, 24. Preferably, the frame holes 30, 32 are positioned in longitudinal direction of stringers 34, 36 of the fuselage sections 1, 2. The fasteners 28 are releasable tension bolts. However, they can also be rivets. In order to enable a tolerance adjustment of the fuselage sections 1, 2, the fasteners 28 have a shank diameter which is smaller than a respective frame hole diameter of the frame holes 30, 32. The frame holes 30, 32 forming one frame hole set for inserting one fastener 28 can have the same hole diameter or different hole diameters.

In order to enhance a transfer of tension forces between the stringers 34, 36, fittings 38, 40 are provided. As illustrated, at the rear fittings 40, the fittings 38, 40 have at least a base plate 42 for the connection to flange portions 44 of the stringer 34, 36 and a front wall 46 for the connection to the web portions 22, 24 of the frame halves 10, 12. Preferably, the fittings 38, 40 are riveted to the flange portions 44 of the stringers 34, 36 and are connected to the frame halves 10, 12 by the fasteners 28 extending through respective holes 48 in their front wall 46.

As particularly shown in FIG. 3, the frame halves 10, 12 are provided with positive locking elements 50, 52. The positive locking element 50, 52 form form-fit areas between the frame halves 10, 12 and are provided for the transfer of shear loads at the circumferential joint 4. As illustrated by the reference numbers 52a, 52b, 52c, 52d of the second fuselage section 12 in FIG. 1, each frame half 10, 12 has four positive locking elements 50, 52, which are arranged in pairs 52a, 52c and 52b, 52d, wherein each positive locking element pair 52a, 52c and 52b, 52d has an offset of 90°. In the shown first embodiment, the pairs 52a, 52c and 52b, 52d are positioned in planes 54, 56 which are inclined to a horizontal fuselage plane 58 and to a vertical fuselage plane 60 in an angle of 45°. Of course, more or fewer positive locking elements 50, 52 can be provided.

As can be seen in FIG. 3, according to the first embodiment each positive locking element 50, 52 has a shape of a shoulder for creating a transfer or contact surface 62, 64 extending in the radial direction and the axial direction. As illustrated by the reference numbers 64a, 64c of the second fuselage section 12 in FIG. 1, the two contact surfaces 64a, 64c of each positive locking element pair 52a, 52c and 52b, 52c are directed in opposite directions. Thus, shear forces can be transferred in a first circumferential direction and in an opposite circumferential direction between the fuselage sections 1, 2.

Figure 4:
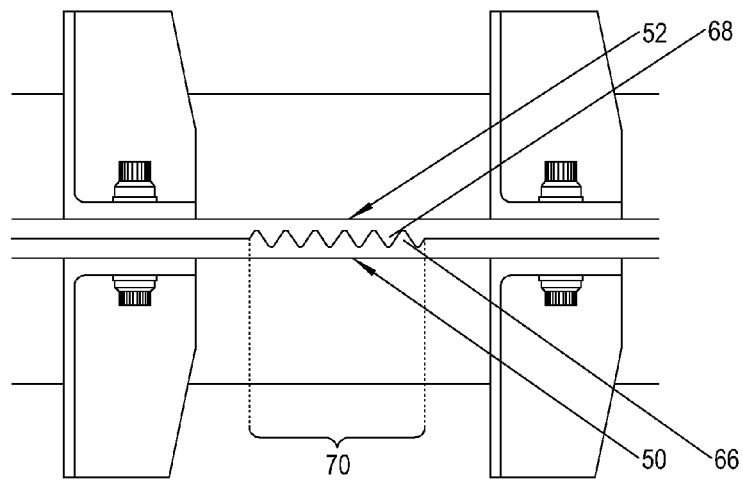
Figure 5:
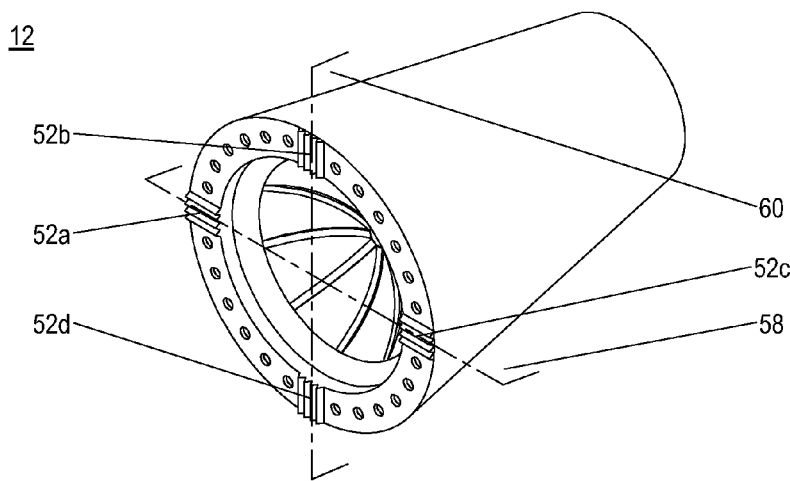

In FIGS. 4 and 5 a second embodiment of an aircraft fuselage structure according to the invention is shown.

As shown in FIG. 4, contrary to the first embodiment according to FIGS. 1 to 3, each positive locking element 50, 52 has a structure such as a serration plate comprising a multiplicity of teeth 66, 68. The structures create an overlapping area 70 which enables a tolerance adjustment between the fuselage sections 1, 2 in the circumferential direction.

As shown in FIG. 5, contrary to the fist embodiment according to FIGS. 1 to 3, one positive locking element pair 52a, 52c is positioned in a horizontal fuselage plane 58 and one positive locking element pair 52b, 52d is positioned in a vertical fuselage plane 60 of the aircraft structure.

In order to enable a tolerance adjustment in the longitudinal direction, in the transversal direction, in the vertical direction and in the circumferential direction, the teeth 66, 68 are orientated more or less in the radial direction of the fuselage sections 1, 2. That means, the teeth 66, 68 of each positive locking element 50, 52 are spaced apart from each other in the circumferential direction.

In what follows, a preferred method for producing an aircraft fuselage structure is presented.

The frame halves 10, 12 are attached to the skin 6, 8 of two fuselage sections 1, 2 via their flange portions 18, 20, wherein before the attachment of the frame halves 10, 12 to the skin 6, 8 or afterwards, corresponding finished frame hole patterns are introduced in their web portions 22, 24.

Then, a glue-like sealing is put on the web portions 22, 24 and the fuselage sections 1, 2 are positioned opposite to each other. Thereby, they are aligned in the horizontal, vertical and in circumferential directions.

Then, the fittings 38, 40 for the connection of the opposite stringers 34, 36 are aligned with the frame holes 30, 32.

After that, the fuselage sections 1, 2 are joined by inserting the fasteners 28, in particular tension bolts, through the frame holes 30, 32 and through the holes 48 of the fittings 38, 40, wherein, as mentioned before, for tolerance adjustment the fasteners 28 have a shank diameter that is smaller than a respective hole diameter of the holes 30, 32, 48.

The attachment of the fittings 38, 40 to the stringers 34, 36 can be done before the fasteners 28 are tightened or afterwards.

In order to avoid any movement in the form-fit areas between the fuselage sections 1, 2 in the circumferential direction, additional fasteners can be set extending through web holes in the form-fit areas. Preferably, the web holes for inserting the additional fasteners are made after the closing of the circumferential joint 4 by tightening the fasteners 28 extending through the frame holes 30, 32.

Disclosed is an aircraft fuselage structure having a first fuselage barrel section and a second fuselage section barrel which are joined by tension fasteners extending through frame holes, wherein a shank diameter of the fasteners is smaller than a respective frame hole diameter, and wherein a first positive locking element and the second positive locking element is provided forming a form-fit area with the first positive locking element in the circumferential direction, and a method for producing such an aircraft fuselage section.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

REFERENCE SYMBOL LIST 1 first fuselage section
2 second fuselage section
4 joint
6 first skin
8 second skin
10 frame half
12 frame half
14 gap
16 sealant
18 flange portion
20 flange portion
22 web portion
24 web surface
26 ring frame
28 fastener
30 frame hole
32 frame hole
34 stringer
36 stringer
38 fitting
40 fitting
42 base plate
44 flange portion
46 front wall
48 hole
50 positive locking element
52, 52a, b, c, d positive locking element
54 Plane
56 plane
58 horizontal plane
60 vertical plane
62 contact surface
64, 64a, c contact surface
66 tooth
68 tooth
70 overlapping area

The invention claimed is:

1. An aircraft fuselage structure, comprising:
a first fuselage section having
a first skin and
a first frame half which is attached to the first skin via a first flange portion and which has a first web portion extending from the first flange portion,
and
a second fuselage section having
a second skin and
a second frame half which is attached to the second skin via a second flange portion and which has a second web portion extending from the second flange portion, wherein
the frame halves are connected by fasteners extending through frame holes directed in a longitudinal direction in the web portions and forming a single frame, wherein
a shank diameter of the fasteners is smaller than a respective frame hole diameter, and, and wherein a clamping force provided by the fasteners is adjustable wherein
the first web portion has a first positive locking element and the second web portion has a second positive locking element both establishing a form-fit area in a circumferential direction,
wherein the first and second positive locking elements are positioned in a plane.

2. The aircraft fuselage structure according to claim 1, wherein each first positive locking element has a shoulder and each second positive locking element has a counter shoulder.

3. The aircraft fuselage structure according to claim 2, wherein the two positive locking elements laying in one plane have opposite counter surfaces.

4. The aircraft fuselage structure according to claim 1, wherein each positive locking element has a structure comprising a plurality of parallel teeth.

5. The aircraft fuselage structure according to claim 4, wherein the teeth of each structure are spaced apart from each other in the circumferential direction.

6. The aircraft fuselage structure according to claim 1, wherein fasteners extend through web holes in the form-fit areas.

7. A method for producing an aircraft fuselage structure comprising
providing an aircraft fuselage structure comprising:
a first fuselage section having
a first skin and
a first frame half which is attached to the first skin via a first flange portion and which has a first web portion extending from the first flange portion,
and
a second fuselage section having
a second skin and
a second frame half which is attached to the second skin via a second flange portion and which has a second web portion extending from the second flange portion,
wherein
the frame halves are connected by fasteners extending through frame holes directed in a longitudinal direction in the web portions and forming a single frame, wherein a shank diameter of the fasteners is smaller than a respective frame hole diameter, and, and wherein a clamping force provided by the fasteners is adjustable
wherein
the first web portion has a first positive locking element and the second web portion has a second positive locking element both establishing a form-fit area in a circumferential direction,
wherein the first and second positive locking elements are positioned in a plane,
attaching frame halves to the skin of two fuselage sections via flange portions,
wherein before the attachment of the frame halves to the skin or afterwards, corresponding finished frame hole patterns are introduced in the web portions of the frame halves,
positioning the fuselage sections opposite to each other,
aligning the fuselage sections in horizontal, vertical and circumferential directions, and
joining the fuselage sections by inserting fasteners through the frame holes, wherein the fasteners have a shank diameter that is smaller than a respective frame hole diameter.

* * * * *